(12) United States Patent
Teske

(10) Patent No.: US 8,905,095 B2
(45) Date of Patent: Dec. 9, 2014

(54) DAY MOTORCYCLE COVER/BLANKET

(76) Inventor: Angela Teske, Stanley, NC (US)

( * ) Notice: Subject to any disclaimer, the term of this patent is extended or adjusted under 35 U.S.C. 154(b) by 224 days.

(21) Appl. No.: 13/227,064

(22) Filed: Sep. 7, 2011

(65) Prior Publication Data
US 2012/0055598 A1 Mar. 8, 2012

Related U.S. Application Data

(60) Provisional application No. 61/380,439, filed on Sep. 7, 2010.

(51) Int. Cl.
B62J 19/00 (2006.01)
B60J 11/00 (2006.01)
B60J 11/06 (2006.01)

(52) U.S. Cl.
CPC . *B62J 19/00* (2013.01); *B60J 11/06* (2013.01)
USPC .......................... 150/167; 150/166; 296/136.1

(58) Field of Classification Search
USPC ......... 150/166, 167; 296/78.1, 136.04, 136.1; 297/219.11; 135/132
See application file for complete search history.

(56) References Cited

U.S. PATENT DOCUMENTS

| 4,283,084 A | | 8/1981 | Gallagher | |
|---|---|---|---|---|
| 5,052,738 A | * | 10/1991 | Li | 296/78.1 |
| 5,372,169 A | * | 12/1994 | Norton et al. | 150/167 |
| 5,385,377 A | * | 1/1995 | Girard | 296/36 |
| 5,386,597 A | * | 2/1995 | O'Neill | 4/498 |
| 5,445,200 A | | 8/1995 | Celestino et al. | |
| 5,533,616 A | | 7/1996 | Crowfoot | |
| 5,562,139 A | | 10/1996 | Cseri | |
| 5,603,591 A | * | 2/1997 | McLellan | 410/97 |
| 5,611,590 A | * | 3/1997 | Filgueiras | 296/97.5 |
| 5,662,372 A | | 9/1997 | Lubkeman | |
| 5,676,288 A | * | 10/1997 | Spirk | 224/463 |
| 5,795,009 A | | 8/1998 | Sack et al. | |
| 5,921,389 A | | 7/1999 | Zoffer | |
| 6,516,844 B1 | | 2/2003 | Henry | |
| 7,013,904 B2 | | 3/2006 | Kofler | |
| 7,058,985 B2 | * | 6/2006 | Tanaka | 2/209 |
| 7,862,100 B1 | * | 1/2011 | Smith | 296/136.1 |
| 2004/0032153 A1 | * | 2/2004 | Atherley | 297/195.12 |
| 2004/0051336 A1 | * | 3/2004 | Chiao et al. | 296/78.1 |
| 2004/0140029 A1 | | 7/2004 | Gafney | |
| 2008/0217969 A1 | * | 9/2008 | Mills | 297/215.1 |
| 2009/0025843 A1 | * | 1/2009 | Keeler | 150/167 |
| 2011/0100517 A1 | * | 5/2011 | Merritt | 150/167 |
| 2011/0148138 A1 | * | 6/2011 | Penman | 296/136.04 |

* cited by examiner

*Primary Examiner* — Sue A Weaver
(74) *Attorney, Agent, or Firm* — Buckingham Doolittle & Burroughs LLC

(57) ABSTRACT

An architecture is presented that provides a lightweight durable cover for a motorcycle or other two-wheeled vehicle that protects the seat, sides, and fuel tank portions of the vehicle when not in use. Friction and/or hook and loop fasteners hold the form fitting cover in place on the motorcycle. The cover may be rolled or folded for convenient storage after removed from the motorcycle.

7 Claims, 5 Drawing Sheets

FIG. 4A
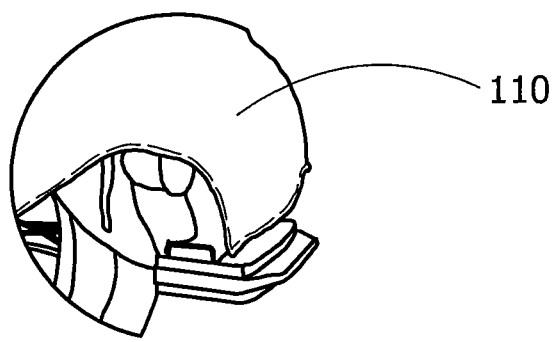
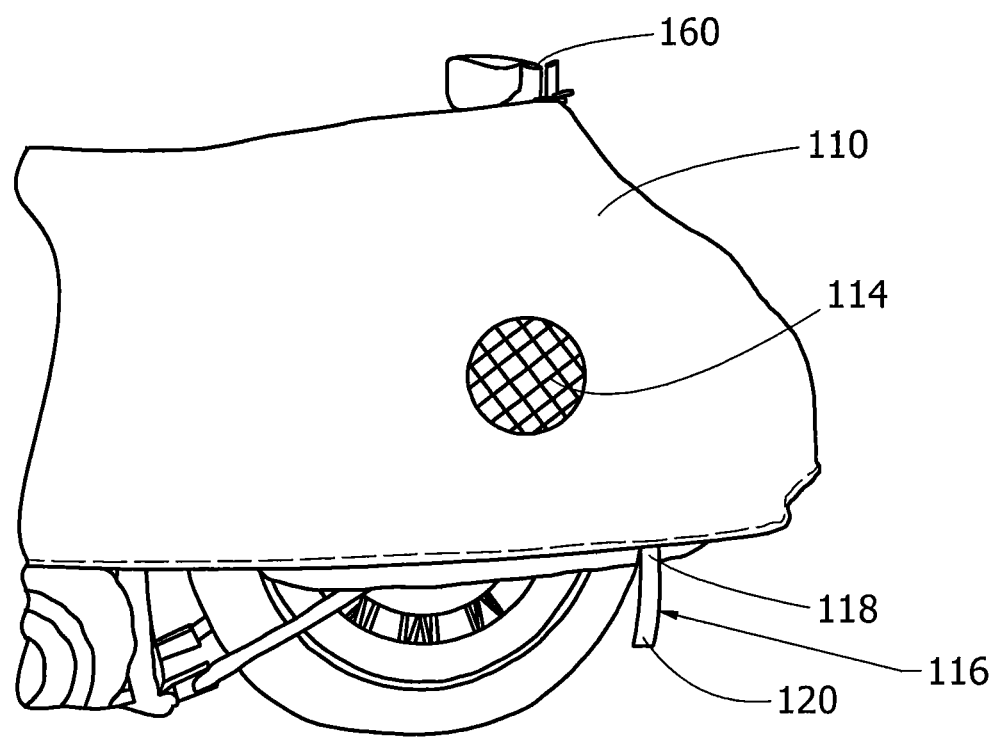
FIG. 4

DAY MOTORCYCLE COVER/BLANKET

CROSS-REFERENCE

This application claims priority from U.S. Provisional Patent Application Ser. No. 61/380,439 filed Sep. 7, 2010.

FIELD OF THE INVENTION

This invention pertains generally to a protective covering for a two-wheeled vehicle, and more particularly to a durable form fitted cover for a motorcycle that protects the seat, fuel tank, and painted elements of the motorcycle from exposure to weather and the elements when the motorcycle is not in use.

BACKGROUND

When not in use, motorcycles, motorized scooters, and other two-wheeled vehicles often sit uncovered outside in driveways or parking lots for extended periods of time. This may leave them exposed to damaging weather elements, such as rain, snow, and harsh sunlight. As a result, motorcycles can develop corrosion on painted or other metal areas, and leather seats may become faded and worn. Additionally, when exposed to the sun for too long, the seats can become extremely hot, making them too uncomfortable to sit on for immediate use.

While motorcycle covers are known in the art, heretofore, efforts to address the above referenced problems have been largely unsuccessful. For example, other covers known in the art are generically shaped and merely drape over the motorcycle being covered and are not form fitting. These types of covers are particularly susceptible to gusts of wind and can be blown off or repositioned on the cycle. Other covers are bulky and difficult to install and/or remove from a cycle, as well as being difficult to store and transport.

Other covers are designed to cover an entire motorcycle, which also makes these types of covers bulky and cumbersome for short trip applications when a user wants a quick alternative. Still other covers are designed to encapsulate the entire motorcycle, which are even bulkier than their counterparts which only cover the entire motorcycle, and are difficult to deploy, remove, store and transport. While these types of covers are useful for long term storage of the motorcycle, they are not practical for short term protection of the cycle, such as when a user is making frequent stops or on a day trip.

Yet other prior art covers utilize metal hooks or other fasteners to secure the cover to the motorcycle. The use of such fasteners may scratch the motorcycle if they disengage under tension or otherwise contact a painted or metal surface, which is undesirable and may result in the need for costly repairs.

Therefore, a need remains for a durable temporary protective covering for a motorcycle that protects the seat, fuel tank, and painted frame elements from sunlight exposure and the weather and that is securely and easily attachable to a wide variety of motorcycle designs and sizes. There is also a need for a short-term protective cover that addresses vehicles with a backrest.

SUMMARY

Accordingly, the present invention overcomes the limitations of the prior art by providing a unique and usable durable protective day cover for a motorcycle that protects the seat, fuel tank, and painted frame elements from sun and weather exposure, and that is securely fitted and relatively easy to deploy and carry on the motorcycle.

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

It is an object of the invention to provide an improved day motorcycle cover that better conforms to a plurality of different sizes and designs useful for protecting a seat, a fuel tank, and a plurality of painted or metal frame elements from exposure to sunlight and weather for an extended period of time.

It is a further object of the invention to present a temporary protective motorcycle cover that is simple to construct and folds or rolls up for convenient storage.

It is another object of the invention to provide a motorcycle cover that is easily customizable so that it is securely fitted around the seat, fuel tank, and part of the frame of a wide variety of motorcycles.

It is an additional object of the invention to provide a cover for a motorcycle that is weather proof and protects from ultraviolet light and bird droppings.

It is an additional object of the invention to provide a motorcycle cover that comprises an opening for a motorcycle seat further having a back rest or elevated support member.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates a side view of the rear lower portion of the present invention.

FIG. 4A illustrates a more detailed view of an alternative embodiment of the rear lower portion of the present invention.

DETAILED DESCRIPTION

Figure 1A:
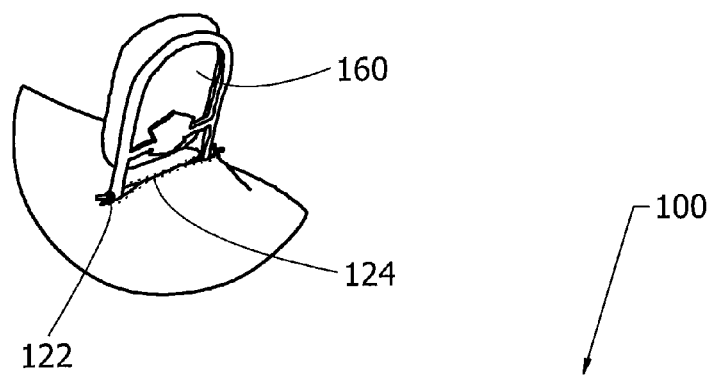
FIG. 1A illustrates a more detailed view of present invention in use in conjunction with a motorcycle having an elevated back rest.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter. The invention relates generally to a relatively light weight, securely fitted cover that protects the seat, fuel tank, and frame elements of a motorcycle or other two wheeled vehicle from exposure to the sun or weather.

Figure 1:
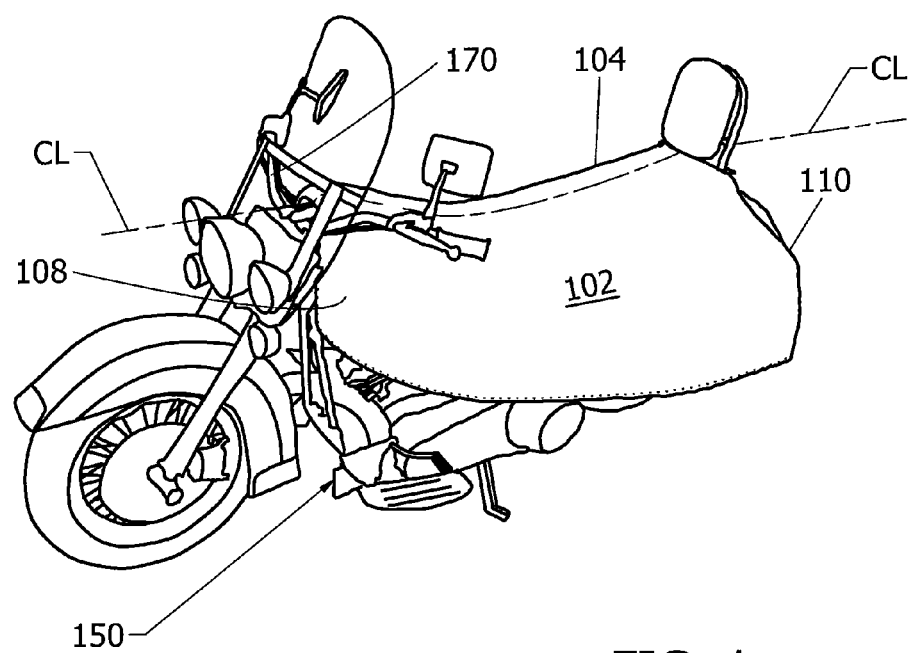
FIG. 1 illustrates a side perspective view of a day motorcycle cover shown in place on a motorcycle at rest.

Referring initially to the drawings, FIG. 1 illustrates a perspective side view of a protective cover 100 for a motorcycle 150 according to one embodiment of the invention. The protective cover 100 comprises a sheet element 102. The sheet element 102 is preferably duck cloth, but may be manufactured from a variety of different materials such as, but not limited to, rubber, plastic, canvas, polymers, cotton fabrics, elastomeric materials, nylon, polyester, Lycra®, and the like. These materials allow the protective cover 100 to be substantially weather resistant while maintaining securely fitting properties so that the protective cover 100 may be securely attached when deployed. Additionally, the construction material may be coated with a protective waterproofing layer or spray, such as silicon for example, to further protect the sheet element 102 from environmental factors such as sun damage, ultraviolet rays, snow, ice, rain, dust, heat, animal droppings, tree sap, pollen buildup, and the like, as well as from the growth of mold or other fungus.

In the preferred embodiment of the present invention, sheet element 102 is generally symmetrical about its centerline and trapezoidal or triangular in shape. Sheet element 102 should also be securely fitted to the motorcycle 150 for which it is suited. However, this is not meant as a limitation as the inventor contemplates other shapes such as parallelograms, ovate, and non-geometrical shapes as part of the invention. Also, the sheet element 102 is designed to preferably cover only the seat, fuel tank, and adjacent parts of the motorcycle frame so that a handlebar 170 and a front wheel remain exposed. However, the shape of the sheet element 102 may vary and is customizable to fit a variety of vehicles requiring a temporary removable protective covering. For example, a customized motorcycle may have a non-symmetrical design due to the preference of the owner. Because the protective cover 100 is generally made to order, the sheet element 102 may be cut to fit the shape required, such as for example to also cover a motorcycle with a single saddlebag on only one side. Similarly, the sheet element 102 may be designed to cover a wide variety of other vehicles that may require temporary protection from the environment such as motorized scooters, bicycles, three-wheeled motorized vehicles, all terrain vehicles, jet skis, watercraft, snowmobiles, and the like.

The dimensions of the sheet element 102 may vary depending on the size and type of motorcycle or vehicle that is protected. While the construction material of the sheet element 102 is generally flexible so that it stretches from just behind the handlebars 170 to the rear of the motorcycle, the length is preferable between 70 and 74 inches. However, while this length may be appropriate for most motorcycles, this is not meant as a limitation in length as other sizes are contemplated to cover shorter and longer applications, such as a shorter dirt bike for example. The width of the sheet element 102 will similarly vary depending on the size of the vehicle to be covered. The thickness of the sheet element 102 is dependant on the material used but is generally less than $1/4^{th}$ of an inch.

Furthermore, the sheet element 102 is preferable a single panel of material. However, as the inventor contemplates customized applications for the protective cover, the sheet element 102 may comprise a plurality of panels (not shown) that are sewn or otherwise attached to each other. When not in use, the entire protective cover 100 is removable and folds and/or rolls into a compact size and shape for convenient storage.

The sheet element 102 further comprises an outer surface 104. The outer surface 104, generally comprise the same material, such as duck cloth or other materials as mentioned supra. The outer surface 104 serves as a layer that protects the motorcycle from the elements, and is therefore generally weather resistant. The outer surface 104 may also be coated or sprayed in a water repellent material.

Figure 2:
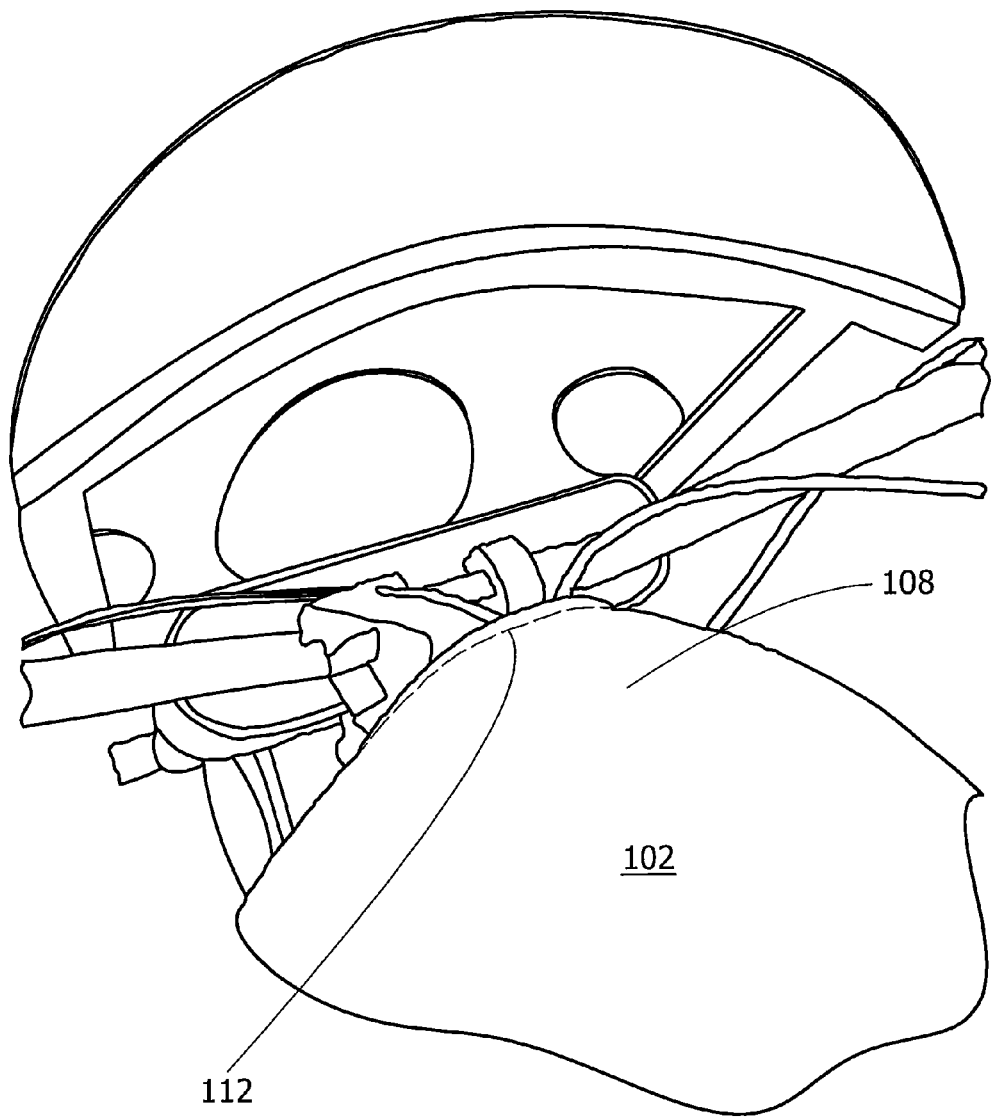
FIG. 2 illustrates a top view of the front upper portion of the present invention.

Next, the sheet element 102 further comprises a front end 108 and a back end 110. The front end 108 is generally the tapered end of the sheet element 102 and covers the fuel tank of the motorcycle 150. As shown in FIG. 2, the front end 108 may comprise an inverted U-shape that extends from the top of the gas tank down the frame of the motorcycle 150. The back end 110 is generally wider to encompass the seat which is typically wider than the fuel tank and other elements such as saddlebags.

As shown in FIGS. 2 and 4, an edge 112 forms a closed-loop seam around the perimeter of the sheet element 102. The edge 112 may be stitched, double stitched, radio frequency welded, glued, folded and over sewn, and the like or formed by any method known to one of skill in the art. Also, the edge 112 is preferably double sewn.

Figure 3:
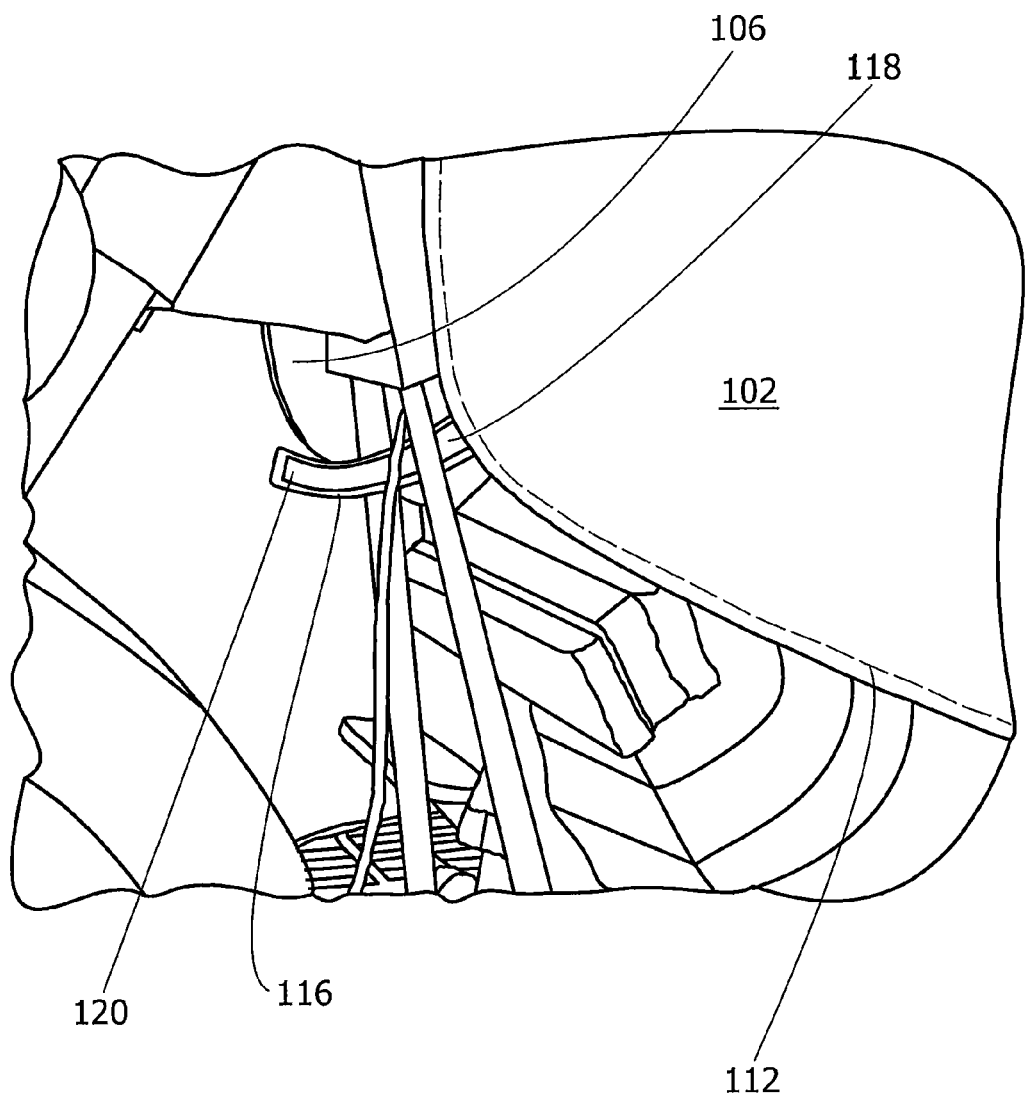
FIG. 3 illustrates a side view of the front lower portion of the present invention.

FIGS. 3 and 4 show a plurality of attachment elements 116 that are flexible and sewn to the sheet element 102 in a plurality of positions. The attachment elements 116 may be sewn, RF-welded, and the like, or attached by any method known to one of skill in the art. The attachment elements 116 preferably comprise hook and loop fasteners, such as Velcro®, to further attach the sheet element 102 to a plurality of attachment points on the motorcycle 150. While hook and loop fasteners are the preferred method of attachment, this is not meant as a limitation as other fastening methods such as hooks and grommets, zippers, ties, and the like may be used as well to secure the protective cover 100 to the motorcycle 150.

Referring back to FIGS. 1 and 1A, an embodiment of the protective cover 100 may further comprise a backrest opening 122. The backrest opening 122 preferably transects the outer surface 104 of the sheet element 102 so that a backrest 160 for the motorcycle 150 may penetrate the backrest opening 122. The backrest opening 122 may be constructed so that the sheet element 102 fits snugly around the backrest 160 so that the motorcycle seat (not shown) is still covered and protected by the sheet element 102.

The backrest opening 122 may comprise a backrest opening seam 124 that lines the backrest opening 122. The backrest opening seam 124 may be a closed-loop seam similarly constructed to the edge 112 seam as described supra. Additionally, the backrest opening seam 124 may be lined with hook and loop material or have attachment elements 116 that may be used to make the backrest opening 122 weather resistant FIG. 4A also shows an embodiment of the protective cover 100 where the back end 110 is cut so that it only drapes the rear of the motorcycle 150. Also, the inventor contemplates a storage bag/carrying pouch (not shown) for attaching to the motorcycle 150 for storage of the protective covering 100 when folded/rolled.

Figure 5:
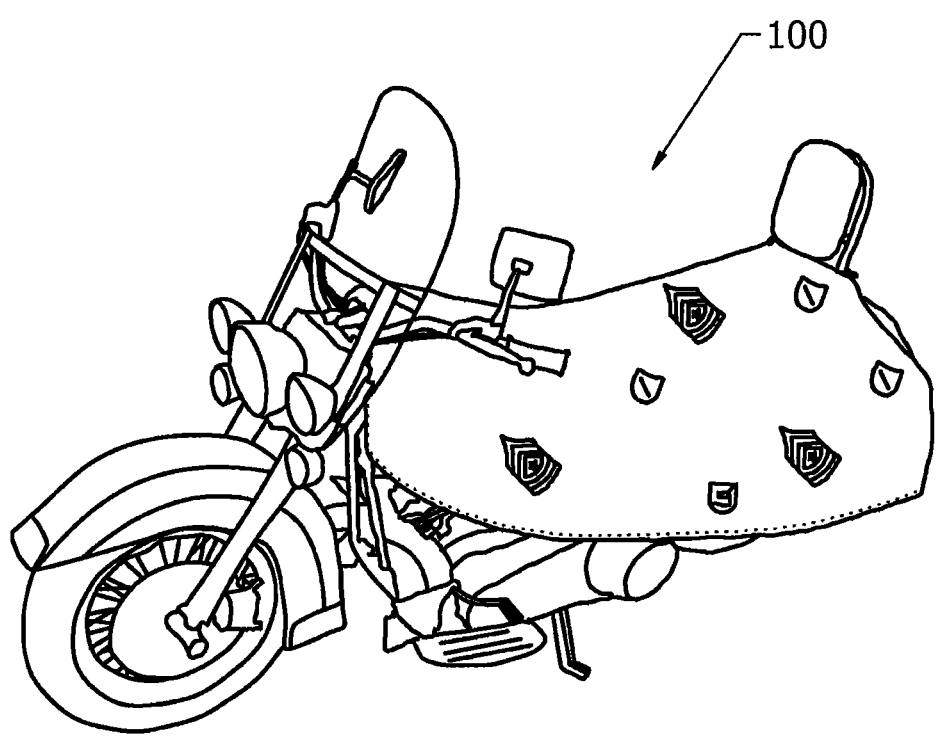
FIG. 5 illustrates a perspective side view of the present invention with a customized design pattern.

FIG. 5 illustrates the protective cover 100 with decorative surface elements. For example, the outer surface 104 may be decorated with stitching, embroidery, decals, paint, dye, and the like. Similarly, the edge 112 may be decorated as well.

What has been described above includes examples of the disclosed device. It is, of course, not possible to describe every conceivable combination of components and/or methodologies, but one of ordinary skill in the art may recognize that many further combinations and permutations are possible. Accordingly, the novel device is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A protective cover for partially covering a vehicle comprising a backrest, a handlebar, a fuel tank, a seat, and a plurality of adjacent frame elements, the protective cover comprising:
    a sheet element configured to partially cover the fuel tank, the seat, and the plurality of adjacent frame elements excluding the handlebar, the sheet element comprising;
    a weather-resistant outer surface;
    a front end tapered in an inverted U-shape;
    a back end widening out of the front end;
    an opening for receiving the backrest transecting the outer surface toward the back end; and
    an edge comprising a closed loop seam; and
    a plurality of attachment elements extending from the edge of the sheet element for engaging the plurality of adjacent frame elements of the vehicle.

2. The protective cover of claim 1, wherein the vehicle with a backrest is a motorcycle.

3. The protective cover of claim 2, wherein the motorcycle further comprises at least one saddlebag, and the back end of the sheet element is wide enough to cover the at least one saddlebag.

4. The protective cover of claim 3, wherein the sheet element is a form fitting single piece of material.

5. The protective cover of claim 4, wherein the protective cover is foldable or rollable.

6. The protective cover of claim 5, wherein the sheet element further comprises a centerline and is shaped so as to be symmetrical about the centerline.

7. The protective cover of claim 6, wherein the opening for receiving the backrest comprises a backrest opening seam that is substantially closeable around the backrest and at least one attachment element for securing the backrest opening seam around the backrest once the protective cover is placed over the motorcycle.

* * * * *